United States Patent [19]

Wong et al.

[11] Patent Number: 5,025,831
[45] Date of Patent: Jun. 25, 1991

[54] COMPACT RADIAL FLOW DISTRIBUTOR

[75] Inventors: Yiu Wah Wong, Succasunna; Jeffrey W. Frederick, Morris Plains; Rutton D. Patel, Berkeley Heights, all of N.J.

[73] Assignee: Exxon Research & Engineering Company, Florham Park, N.J.

[21] Appl. No.: 571,691

[22] Filed: Aug. 24, 1990

[51] Int. Cl.⁵ .............................................. B05B 1/14
[52] U.S. Cl. .............................. 137/561 A; 137/574; 261/97; 239/553.3; 239/553.5
[58] Field of Search ............ 137/561 A, 574; 261/97, 261/98, 110, 113; 239/548, 553, 553.3, 553.5, 567

[56] References Cited

U.S. PATENT DOCUMENTS

| | | |
|---|---|---|
| 390,352 | 10/1888 | Doty . |
| 440,452 | 11/1990 | Weiskittel . |
| 1,329,649 | 2/1920 | Brombacher . |
| 1,451,072 | 4/1923 | Hoffstetter . |
| 1,653,285 | 12/1927 | Houlis . |
| 2,213,955 | 10/1940 | De Freitas . |
| 2,791,466 | 5/1957 | Crisp . |
| 3,263,976 | 8/1966 | Hilinski ................................. 261/98 |
| 3,363,843 | 1/1968 | Ballard et al. ................... 261/110 X |
| 3,408,055 | 10/1968 | Machiels ................................. 261/98 |
| 3,479,146 | 11/1969 | Hochman et al. ............... 239/553.5 |
| 3,630,447 | 12/1971 | Smart et al. ............................ 239/567 |
| 3,723,072 | 3/1973 | Carson et al. ....................... 261/97 X |
| 3,736,095 | 5/1973 | Leatherby . |
| 3,785,779 | 1/1974 | Li et al. ............................... 239/548 X |
| 3,817,689 | 6/1974 | Capy . |
| 3,907,210 | 9/1975 | Dow, Jr. et al. . |
| 4,485,972 | 12/1984 | Freber . |
| 4,808,350 | 2/1989 | Robbins et al. ......................... 261/97 |
| 4,836,989 | 6/1989 | Aly et al. ........................... 261/97 X |
| 4,938,422 | 7/1990 | Koves ................................. 239/553.5 |

*Primary Examiner*—John Rivell
*Attorney, Agent, or Firm*—Joseph J. Dvorak

[57] ABSTRACT

According to the present invention, there is provided a radial flow distributor comprising a cylindrical body portion having a vertical side wall, a top and a bottom. The cylindrical body portion has a horizontal baffle plate disposed within it, thereby dividing the body portion into a first compartment and a second compartment. The horizontally disposed baffle plate preferably is circular in shape and sufficiently large that it meets the side walls of the cylindrical body portion. The baffle also has a central opening in it. Conduit means, operably connected to the first compartment, are provided for introducing fluid to that compartment. A plurality of apertures are evenly spaced around the periphery of the side wall of the second compartment for distributing fluid from the distributor radially outwardly.

6 Claims, 2 Drawing Sheets

COMPACT RADIAL FLOW DISTRIBUTOR

FIELD OF THE INVENTION

The invention relates generally to a device for distributing a single-phase or a two-phase mixed fluid in a radially symmetrical flow pattern. More particularly, the present invention relates to a device for distributing a single phase or mixed phase fluid over a vessel cross-section in which good mixing between the distributed fluid or mixed fluids and the main fluid flow in the vessel are required.

BACKGROUND OF THE INVENTION

In highly exothermic reactions such as hydro-cracking, a fixed catalyst bed is divided into a number of stages with quench boxes between the stages. A quench fluid is introduced into the main fluid flow in the reactor vessel between the stages in order to keep the catalyst bed temperatures within the desirable operating range. The interstage quench assembly usually consists of a quench distributor and a mixing zone quench box located directly below the quench distributor in downflow type reactors. The quench box mixes the quench fluid and the reactor flow before they enter into the catalyst bed downstream. Depending upon the particular type of reaction carried out in the vessel, the quench fluid can be a single-phase gas or liquid or it can be a mixed-phase fluid such as a gas and liquid mixture.

In typical reactors, the quench zone is usually made as small as possible in order to minimize the reactor height and to reduce capital investment.

An object of the present invention is to provide a novel quench fluid distributor which is compact and yet can provide good distribution and effective mixing between the quench fluid or mixture of fluids and the main fluid in the reactor.

SUMMARY OF THE INVENTION

According to the present invention, there is provided a radial flow distributor comprising a cylindrical body portion having a vertical side wall, a top and a bottom. The cylindrical body portion has a horizontal baffle plate disposed within it, thereby dividing the body portion into a first compartment and a second compartment. The horizontally disposed baffle plate preferably is circular in shape and sufficiently large that it meets the side walls of the cylindrical body portion. The baffle also has a central opening in it. Conduit means, operably connected to the first compartment, are provided for introducing fluid to that compartment. A plurality of apertures are evenly spaced around the periphery of the side wall of the second compartment for distributing fluid from the distributor radially outwardly.

In a particularly preferred embodiment of the present invention, the first compartment contains a plurality of vertically oriented baffles for mixing a mixed-phase fluid in the first compartment before it exits the first compartment via the central opening in the horizontal baffle and enters the second compartment for radially outward flow through the apertures in the periphery of the second compartment.

These and other features of the present invention will become better understood upon a reading of the "Detailed Description of the Invention" in light of the accompanying drawings.

DETAILED DESCRIPTION OF THE DRAWINGS

Figure 1:
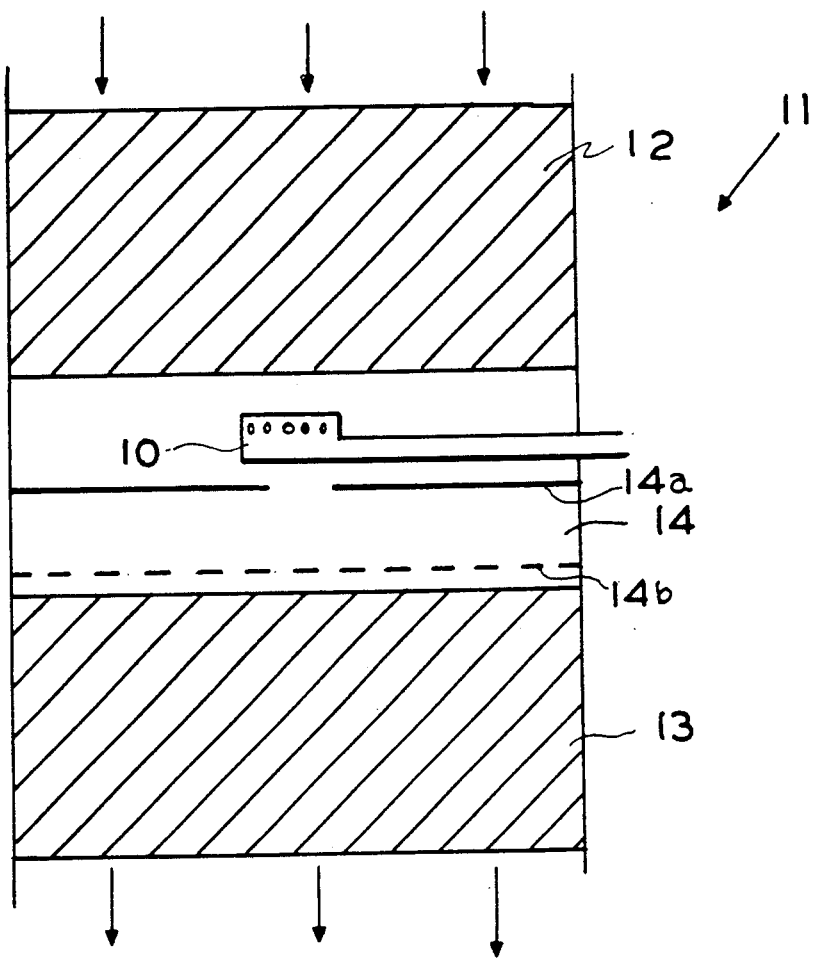
FIG. 1 is a schematic drawing of a section of a fixed bed catalytic reactor having an interbed quenching zone and including the radial flow distributor of the present invention.

Referring now to FIG. 1, there is shown a radial flow distributor 10 located in a vertical cylindrical vessel 11 between two catalyst beds 12 and 13. Also, a quench box or quench mixing zone, shown generally by reference numeral 14, is located between the catalyst beds 12 and 13. As shown in FIG. 1, the quench mixing zone 14 is defined by horizontal plate 14a, having a central opening therein, and a distributor plate 14b. The are, of course, numerous quench box designs known in the art and the radial flow distributor 10 of this invention may be used to advantage with these.

As shown by the direction of the arrows in FIG. 1, the main flow of reactant, such as hydrocarbon feed, is vertically downward, first through catalyst bed 12 and then into the quench mixing zone 14 and finally into catalyst bed 13 for further progress through the reactor. In order to maintain the appropriate temperature level in the catalyst contained within the reactor, quench fluid is introduced into the vessel 11 between the catalyst beds via the radial flow distributor 10 of the present invention.

Figure 2:
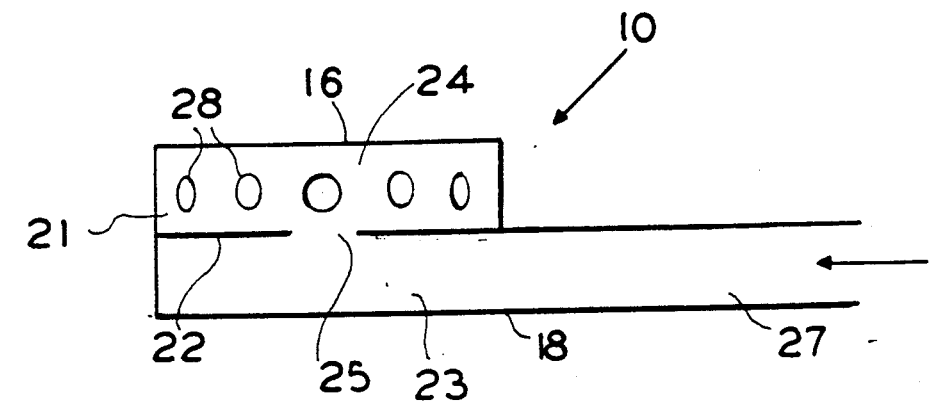
FIG. 2 is a schematic illustration of one embodiment of the radial flow distributor of the present invention.

Reference is now made to FIG. 2, which illustrates in more detail the radial flow distributor 10 of the present invention. As can be seen from FIG. 2, the radial flow distributor 10 of the present invention has cylindrical body portion 21 defined by vertical side walls, a circular top wall 16 and circular bottom wall 18. The device also includes a horizontally disposed baffle plate 22 which divides the body portion 21 into a first compartment 23 and a second compartment 24.

As can be seen in FIG. 2, the horizontal plate 22 has a central opening 25 permitting fluid communication between the first compartment 23 and the second compartment 24. In the practice of the present invention, it is particularly preferred that the aperture 25 be circular. The size of the opening will, of course, depend upon allowable pressure drop across the distributor, fluid flow rate and fluid properties. Selection of the opening size is, however, within the skill of the art. Nonetheless, as a general guide, aperture 25 will normally have a size of from about 0.25 to about 2 times the diameter of conduit 27 with which it communicates.

The conduit 27 is provided for radially introducing quench fluid into the first compartment 23 of the radial flow distributor 10. A plurality of equal sized and evenly distributed apertures 28 are provided on the side wall of the second compartment 24.

In operation, a fluid to be radially distributed is introduced into the first compartment 23 via conduit 27. In first compartment 23, the kinetic energy of the quench fluid is dampened and the flow is redirected through the opening 25 to the second compartment 24. Ultimately, the fluid exits the radial flow distributor 10 through the apertures 28 and is thereby radially distributed.

Figure 3:
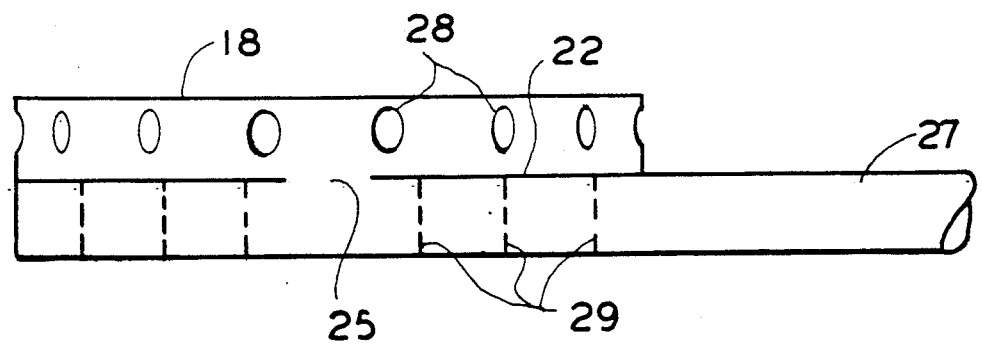
FIG. 3 is a schematic illustration of another embodiment of the radial flow distributor of the present invention with a portion of the side wall shown broken away to expose the baffles located therein.
Figure 4:
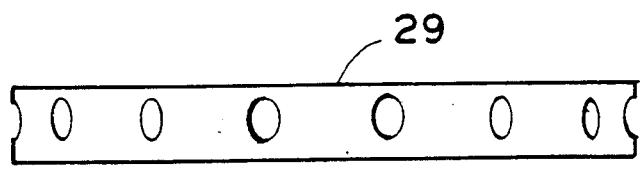
FIG. 4 is a side view of a cylindrical baffle sleeve having a plurality of apertures therein.

In FIG. 3, a particularly preferred embodiment of the present invention is shown. As can be seen from the figure, the first compartment 23 of the radial flow distributor includes a plurality of vertically oriented baffles 29 that extend from the horizontal plate 22 to the bottom 18 of the cylindrical body portion 21. The baffles 29 are arranged relative to each other to promote mixing of a mixed-phase fluid flowing through the distributor 10. Thus, baffles 29 are spaced apart and arranged to provide a circuitous fluid flow path.

Figure 5:
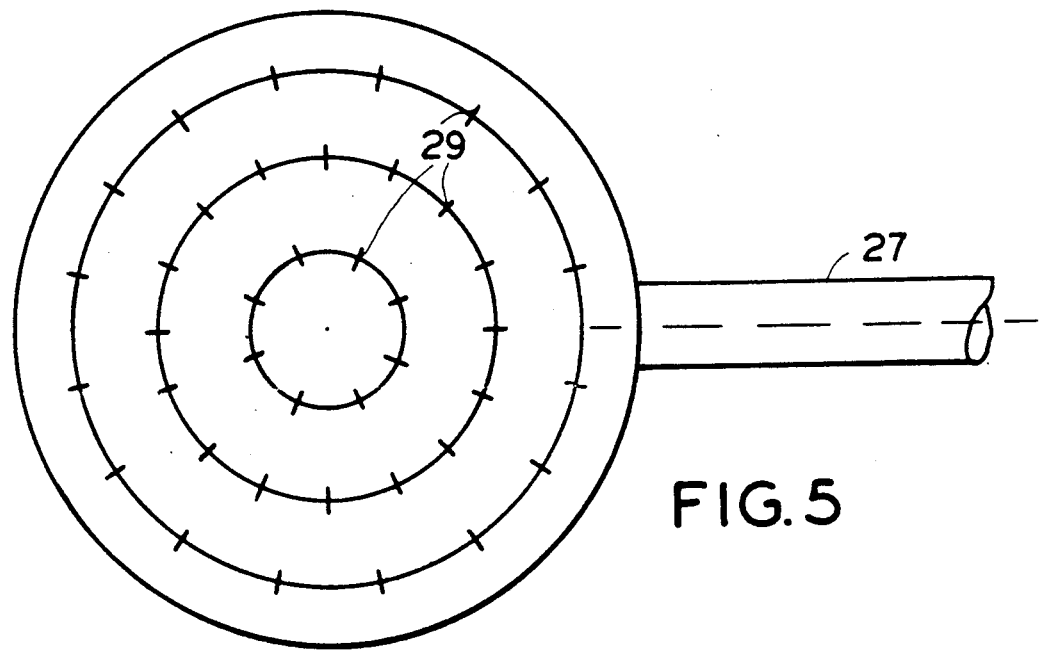
FIG. 5 is a top plan view showing arrangement of a series of concentric baffle sleeves with the apertures therein staggered in accordance with the particularly preferred device of the present invention.

In a particularly preferred embodiment of the present invention, the horizontal baffles 29 are cylindrical sleeves having evenly spaced apertures therein. These sleeves also have different diameters, permitting them to be concentrically arranged. As is shown in FIG. 5, these concentrically arranged sleeves are positioned within the first compartment 23 so that the apertures 30 in each of the next succeeding sleeve or baffle are offset from the preceding apertures. This type of arrangement and use of the baffles 29 has particular utility where it is desired to use to radially distribute a mixed-fluid phase, such as gas and liquid, from the distributor.

In the practice of the present invention, it is particularly preferred that the vertical height of the first compartment be substantially equal to the vertical height of the second compartment; however, it is not critical that this relationship exist. In general, the ratio of the height of the first compartment to second compartment can range from about 1:1 to about 2:1.

The invention will be further illustrated in the accompanying examples.

EXAMPLE 1

A device was constructed substantially as shown in FIG. 2. The diameter of the cylindrical body portion was 15 inches. The first compartment had a height of four inches. The conduit had a diameter of four inches. The second compartment had a height of three inches and was provided with 20 evenly spaced apertures around the periphery of the second compartment. The apertures had a diameter of one inch. Water was fed into the distributor via the conduit at flow rates ranging from 150 gpm to 300 gpm. The pressure drop across the apertures was measured at about 0.3 psi. The observed flow maldistribution, which is defined as:

$$\frac{(\text{Max. flow from hole} - \text{Min. flow from hole}) \times 100\%}{\text{Min. flow from hole}}$$

was about 15%, which is excellent considering the low pressure drop across the distributor holes. It was also observed that the water jets exiting the holes formed a symmetrical radial spray pattern.

EXAMPLE 2

A distributor, similar to that shown in FIG. 1, was constructed having a two inch high first compartment connected to a two inch clear plastic feed pipe and a two inch high second compartment. The second compartment had 16 one-inch apertures evenly spaced around the peripheral wall. The device also contained a set of three concentric cylindrical baffles with one-inch offset holes. The device was tested by introducing water at flow rates ranging from 25 gpm to 225 gpm and air at flow rates of 20 SCFM to 400 SCFM through the feed pipe. Under these conditions, slugging was observed in the clear plastic feed pipe immediately ahead of entrance into the first compartment of the device. However, the flow pulsations were minimized for air-water jets exiting the distributor over a wide range of flow rates. Based on visual observations, the flow distribution of the spray pattern was good and covered a circular cross-section in a generally eve pattern.

The invention which has been described herein may be modified in various ways without departing from the scope of the invention and certain elements may be replaced by others having the same technical function as claimed.

What is claimed is:

1. A radial flow distributor comprising:
   a cylindrical body portion having vertical side walls, a top wall and a bottom wall;
   a horizontal baffle disposed in the cylindrical body portion dividing the body portion into a first compartment and a second compartment, the horizontal baffle having a central opening therein providing fluid communication between the first compartment and the second compartment;
   conduit means operably connected radially to the first compartment for introducing fluid therein; and,
   a plurality of spaced-apart apertures in the side wall of the second compartment whereby, under conditions of use, fluid introduced into the first compartment is redirected by the horizontal baffle to flow into the second compartment and then through the apertures in the walls therein for radial distribution.

2. The distributor of claim 1 wherein the first and second compartments are substantially equal in size.

3. The distributor of claim 2 wherein the central opening in the horizontal baffle has a diameter from about 0.25 to about 2 times the diameter of the conduit.

4. The distributor of claim 2 including a plurality of vertical, spaced-apart baffles located in the first compartment.

5. The distributor of claim 4 wherein the spaced-apart vertical baffles consist essentially of concentric sleeves having apertures therein, the apertures in each sleeve being positioned so that they are offset from the apertures in the next adjacent sleeve.

6. A radial flow distributor comprising:
   a cylindrical body portion having vertical side walls, a top and a bottom;
   a horizontal baffle disposed in the cylindrical body portion dividing the body portion into a first compartment and a second compartment, the horizontal baffle having a central opening therein, and the first and second compartments being substantially equal in size;
   conduit means operably connected to the first compartment for introducing fluid therein;
   a plurality of spaced-apart vertical baffles located in the first compartment, these baffles consisting essentially of concentric sleeves having apertures therein, the apertures in each sleeve being positioned so that they are offset from the apertures in the next adjacent sleeve; and,
   a plurality of spaced-apart apertures in the side wall of the second compartment.

* * * * *